United States Patent [19]

Meinzer et al.

[11] Patent Number: 5,267,016
[45] Date of Patent: Nov. 30, 1993

[54] LASER DIODE DISTANCE MEASUREMENT

[75] Inventors: Richard A. Meinzer; Bruce E. Zepke, both of Glastonbury, Conn.

[73] Assignee: United Technologies Corporation, Hartford, Conn.

[21] Appl. No.: 800,335

[22] Filed: Nov. 27, 1991

[51] Int. Cl.$^5$ ............................................. G01B 11/02
[52] U.S. Cl. ........................................ 356/358; 356/3; 356/4; 356/4.5; 356/356; 356/349; 359/16
[58] Field of Search ...................... 356/3, 44.5, 5, 345, 356/356, 358, 349; 382/31; 359/16, 1, 11

[56] References Cited

U.S. PATENT DOCUMENTS

| | | | |
|---|---|---|---|
| 4,715,706 | 12/1987 | Wang | 356/5 |
| 5,020,901 | 6/1991 | de Groot | 356/4.5 |
| 5,082,364 | 1/1992 | Russell | 356/5 |

*Primary Examiner*—Davis L. Willis
*Assistant Examiner*—LaCharles Keesee
*Attorney, Agent, or Firm*—Gerald L. DePardo

[57] ABSTRACT

A laser diode distance measurement device includes a laser diode 10 which emits light 20 to a lens 22 which provides focussed light 24 incident on a target 26. The light 24 is reflected from the target 26 back to the laser diode 10 which causes the laser diode 10 to emit a light 28 which exhibits intensity pulses (due to coherent interference) related to the distance L to the target 26. A photodetector 30 provides a feedback signal indicative of the intensity of the light 28 to a distance measurement circuit 18. The laser diode 10 is driven by an up-ramp signal that reduces electronic processing and at a frequency that reduces speckle noise. The distance measurement circuit 18 blanks-out a portion of the feedback signal during discontinuities of the laser diode drive signal to minimize associated noise from distorting the distance measurement.

7 Claims, 6 Drawing Sheets

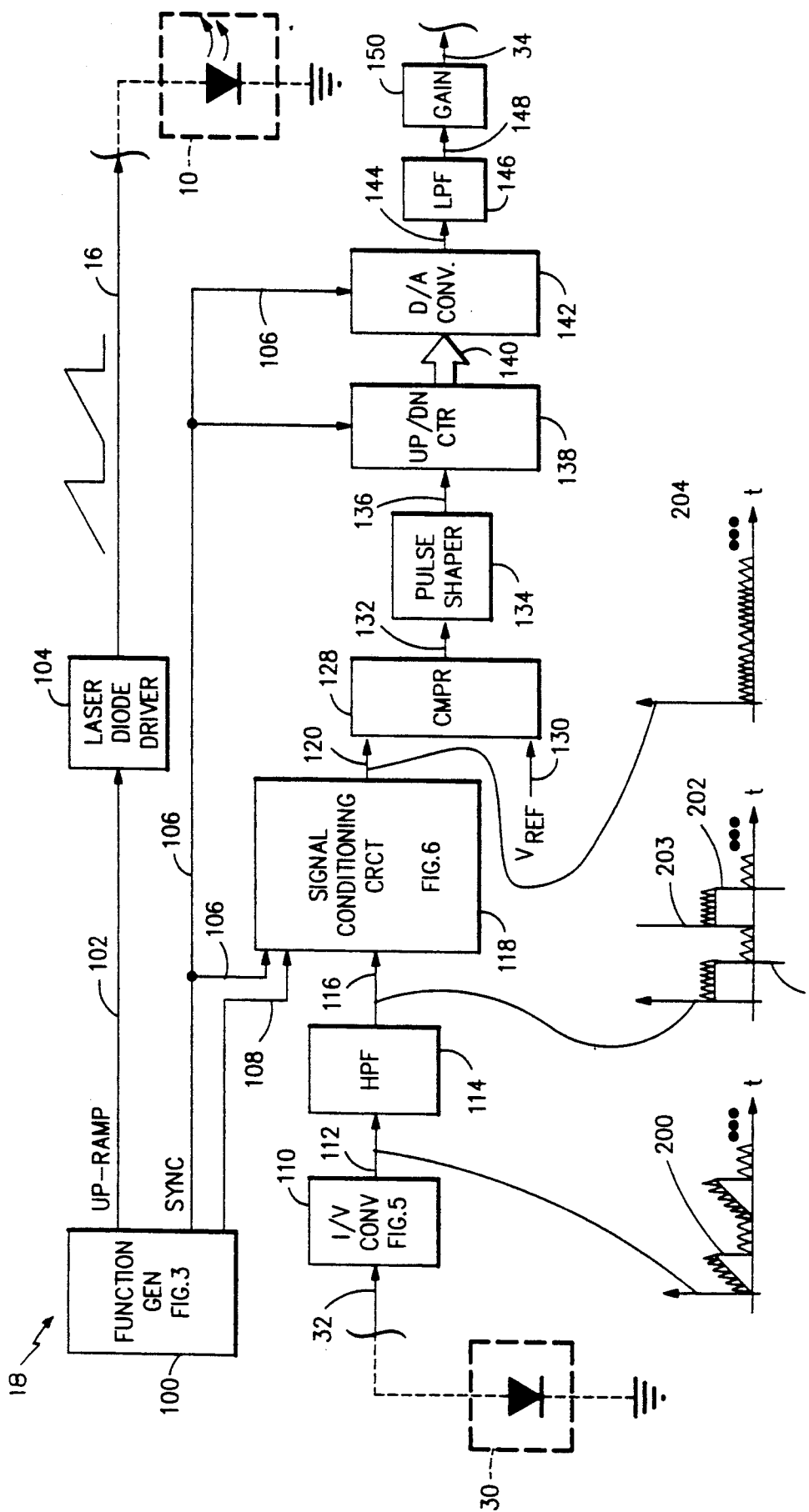

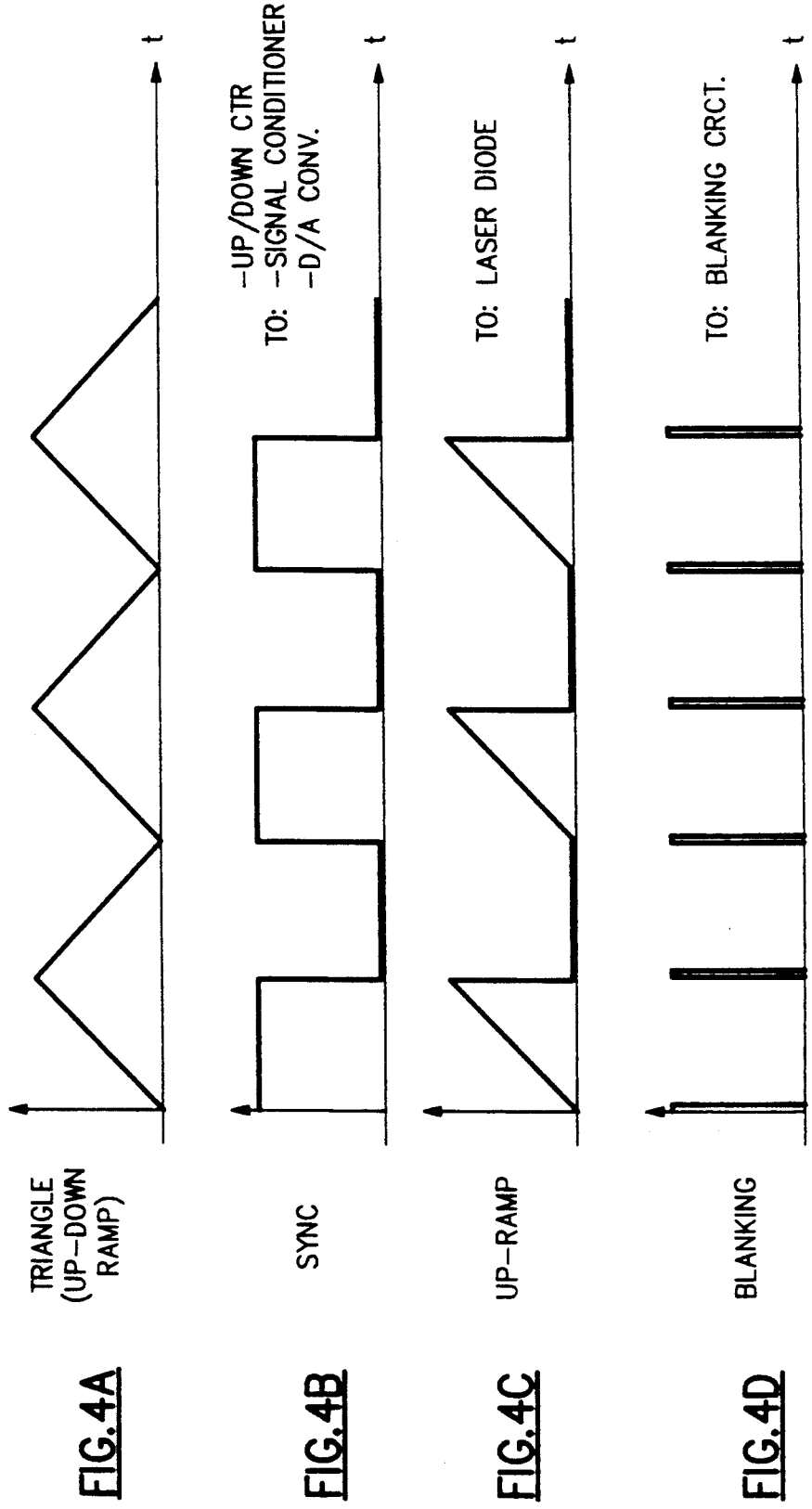

LASER DIODE DISTANCE MEASUREMENT

CROSS-REFERENCES TO RELATED APPLICATIONS

Copending U.S. patent application Ser. No. 800,336 filed contemporaneously herewith contains subject matter related to that disclosed herein.

TECHNICAL FIELD

This invention relates to distance measurement and more particularly to laser diode coherent interference-based distance measurement.

BACKGROUND ART

It is known that semiconductor lasers, such as laser diodes, may be used for measuring distances as described by: G. Beheim et al, "Range Finding Using Frequency-Modulated Laser Diode", Applied Optics, Volume 25, No. 9 (1986).

A laser diode typically has an optical cavity comprising two opposing polished ends (called facets) each having a known index of refraction and having a light amplifying medium therebetween. Light is generated inside the diode cavity by passing electric current through the p-n junction of the diode (typically using ends of the diode other than the facets). The light inside the diode cavity is reflected from a first (e.g., front) facet to a second (e.g., rear) facet in a repetitive manner, thereby providing stimulated emission and the well known laser action. Typically, the front and rear facets are partially transparent (i.e., not 100% reflective). Thus, some light exits the laser from both the front and rear facets. The amount of light exiting an uncoated facet is determined by its index of refraction.

The behavior of a laser diode, as is known, can be significantly affected by external optical feedback, i.e., feedback of a portion of the laser output light back into the laser cavity from an external reflecting surface, as described in the article: R. Lang et al, "External Optical Feedback Effects on Semiconductor Injection Laser Properties", *IEEE Journal of Quantum Electronics*, Volume QE-16, No. 3 (March 1980). A laser diode together with an external reflective surface, e.g., a reflective target, can be viewed as a compound or coupled laser cavity consisting of the diode cavity and an external cavity formed by the reflective target and the laser diode facet facing the target (e.g., the front facet). The distance from the laser to the external surface must be no longer than one-half the coherence length (the distance over which the photons remain in-phase) of the output light because the light must remain coherent over the entire distance traveled (i.e., out to the target and back to the laser). Coupled-cavity effects in conventional lasers are well known, as described in U.S. Pat. No. 4,550,410 entitled "Coupled Cavity Laser" to Chenausky et al.

It is also known that if the current through a laser diode is changed from one level to another, the optical frequency that the laser diode operates at (or "lases" at; also called the "free running" frequency) will change in response thereto. More specifically, when the current is increased, the wavelength of the laser diode gets longer and, thus, the frequency that it operates at decreases. This occurs, as is known, because the temperature of the laser diode material changes with current, which causes a change in the index of refraction of the material, which causes a change in the cavity optical path length $L_d$ (also called effective diode cavity length) which is the product of the index of refraction of the laser material and the physical length of the laser cavity.

It is also known that as the optical operating frequency of the laser changes, the intensity of output light emitted from the facet not facing the target will exhibit ripples or undulation pulses (also called "mode-hops"). These intensity pulses are due to coherent interference within the laser diode between the light reflected from the target (that reenters from the facet facing the target) and the light inside the laser diode (provided the distance from the laser to the target stays fixed). Pulses occur, as is known, at laser operating frequency intervals equal to the frequency difference between consecutive external cavity modes:

$$c/2L \qquad \text{Eq. 1}$$

where c is the speed of light and L is the distance from the front facet to the target. It is also known that these pulses can be readily detected by differentiating the light intensity signal emitted from the rear facet.

If the target is an integral number of laser diode cavity optical path lengths $L_d$ from the laser diode, maximum constructive coherent interference occurs, and the peak amplitude of the output intensity pulses are a maximum. Similarly, if the distance from the target to the laser diode is a non-integer multiple of $L_d$, the peak amplitude of the pulses are reduced due to destructive interference of the reflected light, but are still measurable. Thus, the peak amplitude of the intensity pulses varies with the distance but are still measurable independent of whether or not the target is an integer multiple of $L_d$ from the laser, as described in Lang et al.

In known laser diode distance measurement experiments, such as that described in Lang et al and Beheim et al, a known photo detector and accompanying electronics have been used to measure the light emitted from the rear facet of the laser and to produce a voltage signal indicative thereof. The voltage signal from the detector is analyzed to determine distance information.

The distance L from the front facet to the target is given by the known equation:

$$L = Nc/2\Delta F \qquad \text{Eq. 2}$$

where N is the number of intensity pulses (or external cavity "mode-hops") that occur over the laser frequency change $\Delta F$; c is the speed of light; and $\Delta F$ is the change in laser frequency that occurs due to the change in laser diode drive current. L is very much (many orders of magnitude) larger than the optical path length of the laser diode cavity. Thus, the distance L to the target may be determined by merely counting the number N of "mode-hops" that result from the laser frequency change $\Delta F$. The theoretical resolution in distance measurement, as is known, is the distance corresponding to one "mode-hop" or:

$$\Delta L = c/2\Delta F \qquad \text{Eq. 3}$$

Thus, if $\Delta F = 50$ GHz, then $\Delta L = 3$ mm, which is good resolution, as discussed in Beheim et al.

However, numerous problems occur in attempting to implement laser diode coherent interference-based distance measurement in a real-world environment. First, one of the largest problems with coherent light detection is speckle noise. Speckle noise, as is known, is an optical noise generated as a consequence of the scattering of coherent light when it hits a surface that is not perfectly flat (on a wavelength scale). Also, all targets exhibit a finite amount of surface vibration, which increases speckle noise. Furthermore, if the target is rotating, such as a helicopter rotor blade (like that described in copending U.S. patent application Ser. No. 07/665,061, filed Mar. 6, 1991), some wobble will exist which also increases speckle noise. This noise interferes with coherent detection and can cause the optical intensity to drop-off periodically as a function of distance to the target, thereby preventing intensity measurement at certain distances (i.e., measurement drop-out) and making distance measurement unreliable.

Second, Beheim et al discusses using an up-down ramp (positive sloped ramp followed by a negative sloped ramp) current waveform to drive the laser diode; however, an up-down ramp produces a DC shift in the differentiated waveform which varies as a function of the number of pulses seen over a given ramp time, thereby causing nonuniform pulse amplitudes, which can lead to inaccurate distance measurement. Furthermore, an up-down ramp can generate intensity pulses in two opposite polarities, requiring electronics that detects both polarities. Also, the up-down ramp waveform introduces inaccuracy due to the abrupt change in the waveform slope (from positive to negative).

Also, it is known that if the target is in motion (i.e., has a finite velocity), additional pulses (with similar amplitude characteristics as those discussed hereinbefore) will appear on the laser output signal due to a known Doppler effect (called the Doppler frequency Fd). This occurs whether or not the laser diode drive current (i.e., the laser optical frequency) is changing with time. Consequently, the total number of pulses per sweep of the drive current (herein called a ramp cycle) emitted from the laser is related to the distance (Fx) and the velocity (Fd) of the target. More specifically, for an up-down current ramp drive signal, when the drive current is increasing and the target is moving toward the laser, the number of pulses seen on the feedback is: Fx+Fd. Conversely, when the drive current is decreasing and the target is moving toward the laser, the number of pulses seen is: Fx−Fd. If Fd is greater than Fx (i.e., the target is moving faster than a certain speed) the result of the relation: Fx−Fd, is negative and the direction of the pulses on the decreasing slope will change polarity, thereby requiring the electronics to compensate for this occurrence. This requires the electronics to be much more complex and costly, or that velocity constraints be placed on the target. If the target is moving away from the laser, the above relationships are the same except the sign of Fd is reversed for both cases.

DISCLOSURE OF THE INVENTION

Objects of the invention include provision of laser-based distance measurement, which reduces speckle noise, which uses minimal electronics, which minimizes inaccuracies caused by discontinuities of the laser drive signal, and which does not put velocity constraints on the target.

According to the present invention, a laser, such as a laser diode, having a variable operating frequency controlled by a laser drive signal, emits a first output light which is incident upon a target; the first output light is scattered by the target and fed back into the laser; coherent interference occurs between the scattered light and the light within the laser, thereby producing a second output light having an intensity related to the distance from the laser to the target; the second output light is converted to a signal solely proportional to the distance to the target; the laser operating frequency is modulated at a rate which minimizes optical speckle noise.

According further to the invention, the laser drive signal has a shape chosen so as to minimize electronics. According still further to the invention, a portion of the optical feedback signal is not used (blanked-out) to prevent disruption of the distance measurement due to abrupt changes in the current waveform (i.e., when intensity discontinuities occur) and/or due to electronic noise (caused by signal differentiation or other signal processing).

The present invention employs techniques which improve accuracy and realizability of laser distance measuring sensors by reducing speckle, minimizing electronics, and minimizing the effects of current drive discontinuities which can cause inaccuracies in distance measurement. The invention may be used for any distance measurement application, e.g., a back-up obstruction detector for an automobile, to position an elevator car in a hoistway to close-in to a floor position, or to determine vehicle ride-height. A further advantage of the invention is that it uses coherent light; thus, it requires minimal optical backscatter (nanowatts) and it is undisturbed by incoherent light such as sunlight, street lights, or car headlights.

The foregoing and other objects, features, and advantages of the present invention will become more apparent in the light of the following detailed description of exemplary embodiments thereof, as illustrated in the accompanying drawings.

BRIEF DESCRIPTION OF THE DRAWINGS

FIG. 2 is a schematic block diagram of a distance measuring circuit within the distance measuring device of FIG. 1 including illustrations: (a) a plot of pulses superimposed on a drive waveform, (b) a plot of an exemplary signal from a high pass filter, and (c) a plot of an exemplary signal from a signal conditioning circuit.

FIG. 4(a-d) are plots of signals generated by the function generator circuit of FIG. 3.

BEST MODE FOR CARRYING OUT THE INVENTION

Figure 1:
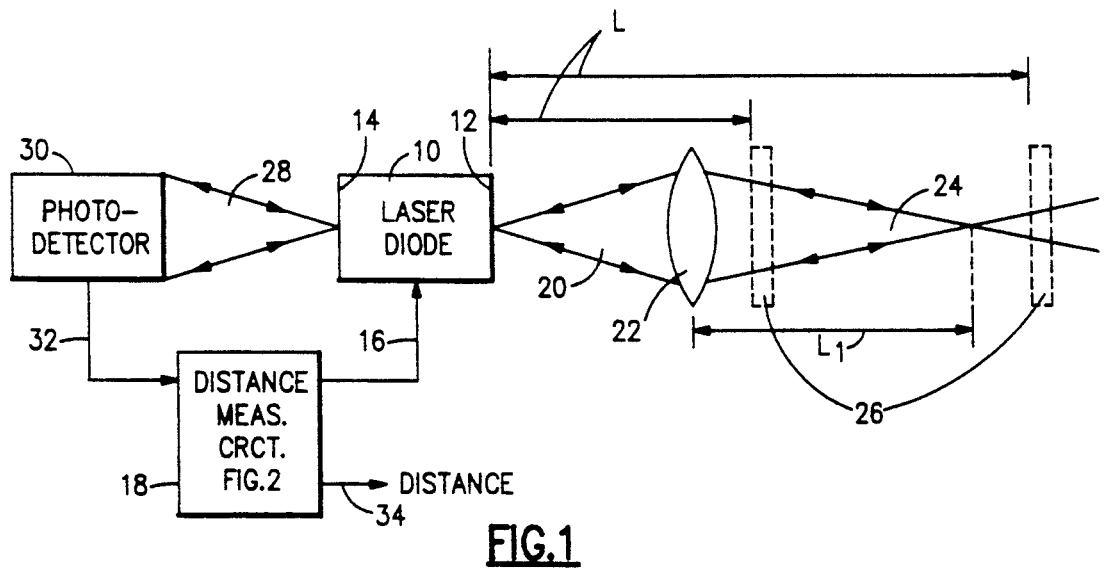
FIG. 1 is a schematic block diagram of a distance measuring device in accordance with the present invention.

Referring to FIG. 1, a laser diode distance measuring device includes a known laser diode 10, e.g., a Mitsubishi ML3101 laser diode with built-in photodiode, having a front facet 12 (or polished end) which is approximately 10% reflective and a rear facet 14 which is approximately 40% reflective. More light exits from the side with the lower reflectivity, as is known. The laser diode 10 is made of a semiconductor material, e.g., aluminum gallium arsenide (AlGaAs), and basically comprises a PN junction, i.e., P-doped AlGaAs monolithically adjacent to N-doped AlGaAs having various concentrations of the constituent materials. Polishing the ends of the semiconductor promotes a phenomenon known as Fresnel reflection which determines reflectivity based on the refractive index of the material. Other characteristics of the laser diode are as follows: wavelength=830 nanometers; coherence length=approximately 4 meters; and output power=approximately 3 milliwatts. Other semiconductor lasers may be used if desired provided half the coherence length is less than the desired distance to the target (as discussed hereinbefore) and the power level is adequate relative to the distance to the target. The laser diode 1 is driven by an electric current signal on a line 16 from a distance measurement circuit 18 (discussed hereinafter).

The front facet 12 of the laser diode 10 emits divergent light 20 to a known lens 22, e.g., a graded index rod microlens (GRIN lens), Nippon Sheet Glass Company (NSG), Part No. W30-0110-078, having a diameter of 3 mm, a length of 3.3 mm, and an anti-reflective coating. Typically, the lens 22 is disposed on the front facet 12 of the laser diode 10 with no space therebetween; however, there may be space between them if desired. The lens 22 converts the divergent light 20 into a focused beam 24. The beam 24 is focused on a fixed distance L1, e.g., two feet, from the lens 22. A target 26 has a variable unknown distance L, ranging from 6" to 3'6", from the front facet 12, which is calculated by the invention. Other ranges for the distance L to the target 26 may be used if desired provided the laser intensity is high enough to provide adequate optical feedback. Alternatively, a collimated beam may be used instead of the focussed beam 24, provided the diameter is small enough, e.g., 1/16", and/or the intensity is high enough to provide adequate optical feedback. Coherent light from the lens 22 is reflected from the target 26 back through the lens 22 into the laser diode 10 through the front facet 12, where constructive interference occurs within the laser diode 10, as discussed hereinbefore. The target 26 may be made of any material, e.g., plastic, wood, or metal, provided it scatters coherent light of the wavelength produced by the laser diode 10.

The rear facet 14 of the laser diode 10 emits divergent light 28 which is incident upon a photodetector 30 (or photodiode). The output light 28 from the rear facet 14 exhibits intensity pulses related to the distance L to the target 26, as discussed hereinbefore. The laser diode 10 and the photodiode 30 are typically one complete assembly; however, separate parts may be used if desired. The photodetector 30 provides an electric current signal on a line 32, indicative of the intensity of the light 28 incident thereon, to the distance measurement circuit 18. The distance measurement circuit 18 converts the current signal on the line 32 to a voltage signal on a line 34 indicative of the distance L to the target 26.

Referring to FIG. 2, the distance measurement circuit 18 includes a function generator 100 which provides a voltage signal on a line 102 to a laser diode driver 104, e.g., a Melles Griot, Part No. 06DLD201. The laser diode driver 104 converts the voltage ramp signal that ramps from 0 to 20 millivolts, on the line 102 to a current ramp signal that ramps from 29 to 31 milliamps (FIG. 4, Illust. c) on the line 16 which drives the laser diode 10. Other laser diode drivers and other voltage and current ramp ranges may be used if desired. The invention drives the laser diode 10 in the active region of the diode with a current drive (up-ramp) waveform signal on the line 16 comprising a positive slope ramp followed by a zero slope down-step (FIG. 4, Illust. c), with a dc offset of approximately 30 milliamps. Other signal offsets and ranges may be used if desired. The sweep frequency of the current drive waveform on the line 16 is 1KHz; however, other frequencies may be used if desired, as discussed hereinafter. The function generator 100 also provides a sync signal on a line 106 and a blanking signal on a line 108 (both discussed hereinafter).

Figure 3:
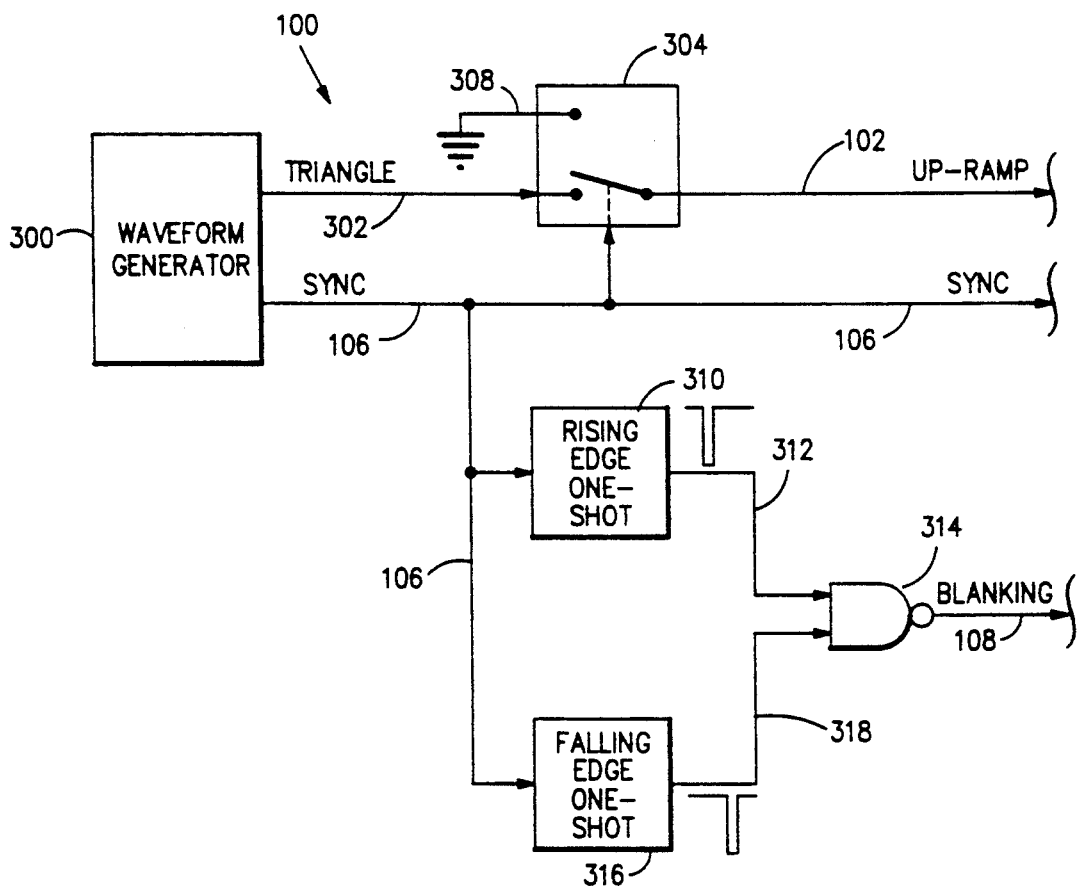
FIG. 3 is a schematic block diagram of a function generator circuit within the distance measuring circuit of FIG. 2.

Referring now to FIG. 3, the function generator 100 includes a triangular (up-down ramp) waveform generator 300, e.g., an Intersil 8038. The triangular waveform generator provides a triangular waveform signal (FIG. 4, Illust. a) on a line 302 to one input of a switch 304, e.g., Analog Devices, Analog Switch, Part No. AD7512. The other input of the switch 304 is connected to a line 308 which is connected to ground (0v). The triangular waveform generator 300 also provides a square wave signal (or sync signal; FIG. 4, Illust b) on the line 106 which is fed to, among other things, the switch 304. The sync signal is high (e.g.,+5v) during the positive slope of the triangular waveform, and is low (e.g., 0v) during the negative slope of the triangular waveform (FIG. 4, Illust. a). When the sync signal on the line 106 is high, the switch 304 connects the triangular waveform signal on the line 302 to the line 102. When the sync signal on the line 106 is low, the switch 304 connects the 0v signal to the line 102. The resultant voltage signal (FIG. 4, Illust. c) on the line 102 provides the desired laser diode current drive waveform, with a dc offset, on the line 16 (FIGS. 1, 2).

The sync signal on the line 106 is also connected to the rising-edge input of a first one-shot device 310, e.g., National Semiconductor, Part No. CD4528B, which provides a low pulse of a predetermined time duration, e.g., 10 microseconds, on a line 312 when the sync signal changes from a low to a high state. The line 312 is connected to one input of a NAND gate 314. Similarly, the line 106 is connected to the falling-edge input of a second one-shot device 316 having a low pulse output signal on a line 318 when the sync signal changes from a high to a low voltage. The line 318 is connected to the other input of the NAND gate 314. The NAND gate 314 provides an output signal on the line 108, that is high when either input signal to the NAND gate 314 is low. Thus, the signal on the line 108 exhibits a high pulse when either one-shot, 310 or 316, produces a low pulse; otherwise, the signal is high. The resulting waveform (FIG. 4, Illust. d) is a narrow high pulse at the beginning and end of each period of the up-ramp waveform (FIG. 4, Illust. c) and is called a blanking signal (discussed hereinafter).

Figure 5:
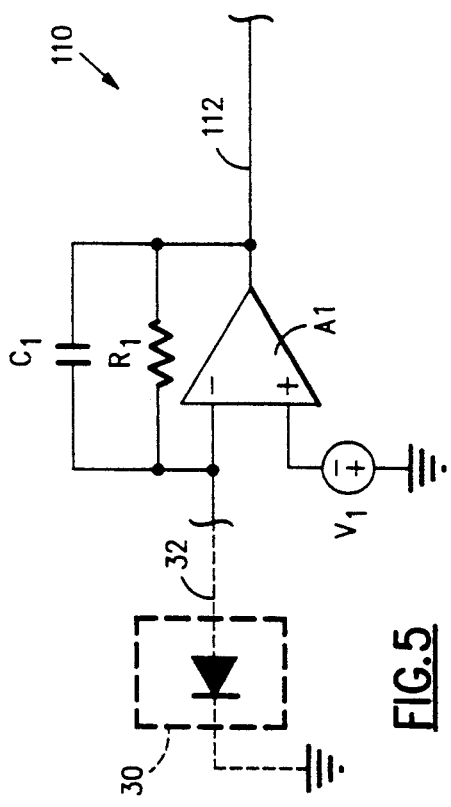
FIG. 5 is a schematic block diagram of a current-to-voltage (I/V) converter within the distance measuring circuit of FIG. 2.

Referring to FIG. 2, the current from the photodiode 30 on the line 32 is provided to a known current-to-voltage (I/V) converter 110 which converts the input current to an output voltage on the line 112, having characteristics similar to the input current, i.e., ramps and pulses related to intensity changes, but with units of voltage. As shown in FIG. 5, the I/V converter 110 comprises a high-bandwidth low-noise operational amplifier A1 (opamp), e.g., OP470, the photodiode 30, a resistor R1 (e.g., 2 k ohms), a capacitor C1 (e.g., 50 picofarads), and a bias voltage V1 (e.g.,−3 volts). The output voltage on the line 112 is related to the current through the photodiode 30, the value of the resistor R1, and the value of the bias voltage V1. The feedback capacitor C1, together with the parallel resistor R1, serves to reduce high frequency noise by attenuating frequencies greater than 1.6 MHz. The bias voltage V1 shifts the dc level of the output voltage to the desired level. The change in output ramp voltage is about 150 millivolts, corresponding to a change in the laser diode 10 drive current ramp (and hence output intensity) of 29 to 31 mA. Similarly, voltage pulses ranging from 1 to 2 millivolts peak correspond to current pulses indicative of the optical coherent interference discussed hereinbefore. Other electronic configurations for the I/V converter 110 may be used if desired. The signal on the line 112 is similar to a waveform 200 (FIG. 2, Illust. a). The voltage signal on the line 112 is provided to a high pass filter 114 which acts as a differentiator to separate and amplify the high frequency pulses (FIG. 2, Illust. a) from the low frequency up-ramp (FIG. 4, Illust. c). More specifically, the high pass filter 114 is a single pole filter with a positive slope of 20 db/decade having a DC gain of zero and a break frequency of 120 KHz beyond which the magnitude of the filter gain is flat at a gain of 10. The output of the high pass filter 114 provides a differentiated signal similar to that shown by the waveform 202 (FIG. 2, Illust. b). The filter 114 is made from opamps, e.g., OP470, resistors, and capacitors in a known negative feedback configuration, e.g., a 500 picofarad capacitor in series with a 2.7 kohm resistor connected to the negative input; a 27 kohm negative feedback resistor; and a direct connection from the positive input of the opamp to ground. Other opamps and component configurations may be used if desired.

The differentiated signal from the high pass filter 114 is provided on a line 116 to a signal conditioning circuit 118. The signal conditioning circuit 118 amplifies the signal on the line 116, e.g., by 50, removes the square wave component from the waveform, zeros (or blanks-out) a portion of the signal, shifts the dc level of the signal to provide a consistent value (0v) for the low portion of the signal, and provides some limited high frequency filtering. The resulting signal (FIG. 2, Illust. c), provided on a line 120, has a series of pulses extending from a common minimum voltage (reference plane) of approximately zero volts. Other common minimum voltages may be used if desired.

Figure 6:
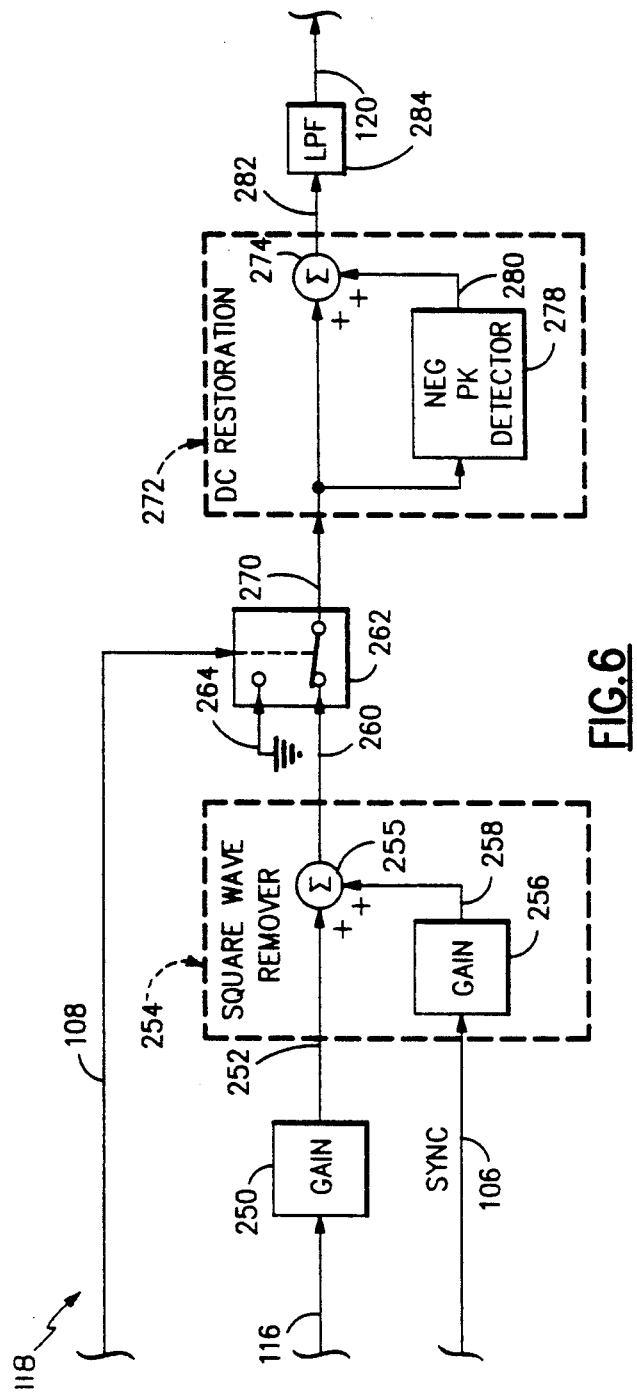
FIG. 6 is a schematic block diagram of a signal conditioning circuit within the distance measuring circuit of FIG. 2.

More specifically, referring to FIG. 6, the signal conditioning circuit 118 includes a gain stage 250, comprising known electronics such as opamps and resistors, which amplifies the differentiated signal on the line 116 by 50. Other gain stages may be used if desired. The amplified differentiated signal is provided on a line 252 to a square wave remover circuit 254 which removes the square wave component of the differentiated amplified signal on the line 252 (compare Illusts. b and c, FIG. 2). The signal on the line 252 is fed to a first input of a summer 255. The sync signal (FIG. 4, Illust. b) on the line 106 is fed to a gain stage 256 which shifts the magnitude of the sync signal to the same magnitude and opposite sign of the square wave component of the amplified differentiated signal on the line 252. The output signal from the gain stage 256 is provided on a line 258 to a second input of the summer 255. The summer 255 adds the signals on the two input lines 252, 258 and the resulting signal is provided on a line 260 having the square wave component removed.

We have found that when the diode current drive signal on the line 16 abruptly changes slope (i.e., exhibits a discontinuity), high frequency harmonics are generated on the optical feedback signal causing additional pulses to occur for a short time, e.g., 10 microseconds, near the discontinuity, thereby distorting the distance measurement. We have also found that the signal on the line 116 exhibits spikes 203 (FIG. 2, Illust. b) on the rising and falling edges of the signal due to the differentiator effects of the HPF 114 and causes an overall shift in the signal level which causes inaccuracies in the measurement of the pulses. Furthermore, we have found that zeroing or blanking-out the signal during this time eliminates this measurement distortion without sacrificing any appreciable accuracy. The signal on the line 260 from the square wave remover circuit 254 is fed to one input of a switch 262, e.g., Analog Devices, Analog Switch, Part No. AD7512. The other input of the switch 262 is connected to a line 264 which is connected to ground (0v). The blanking signal (FIG. 4, Illust. d) on the line 108 from the function generator 100 is also fed to the switch 262 and controls the selection of the output signal provided on a line 270. When the blanking signal is high, the switch 262 connects the signal from the square wave remover circuit 254 on the line 260 to the line 270. Similarly, when the blanking signal is low, the switch 262 connects the 0 v signal on the line 260 to the line 270. As discussed hereinbefore, the blanking signal (FIG. 4, Illust. d) exhibits a short duration pulse during discontinuities of the current drive up-ramp signal (FIG. 4, Illust. c), i.e., at the beginning and the end of the ramp portion. Thus, the output signal on the line 270 looks just like the input signal on the line 260 except that the signal is set to 0v for a short period, e.g., 10 microseconds, at the beginning and end of the current ramp (due to the blanking signal pulses). Thus, these pulses, in effect, blank-out the signal on the line 260. It may not be required to provide a pulse at the beginning of the ramp if this portion of the ramp signal increases at a very gentle rate so as not to introduce any high frequency components in the optical feedback signal scattered back from the target 26 and not to cause the high pass filter to generate a spike.

The signal conditioning circuit 118 also includes a DC restoration circuit, to which the signal on the line 270 is fed, which shifts the input signal such that the low magnitude portion of the signal is always the same value e.g., 0v. The signal on the line 270 is fed to a first input of a summer 274 and also to a negative peak detector 278. The negative peak detector 278 provides a positive signal on the line 280 indicative of the average lowest value (e.g., within the past 2 milliseconds) of the input signal. The signal on the line 280 is fed to a second input of the summer 274, thereby shifting up the signal on the line 270 by the amount it was below zero volts. The resultant signal is provided on a line 282.

Figure 7A:
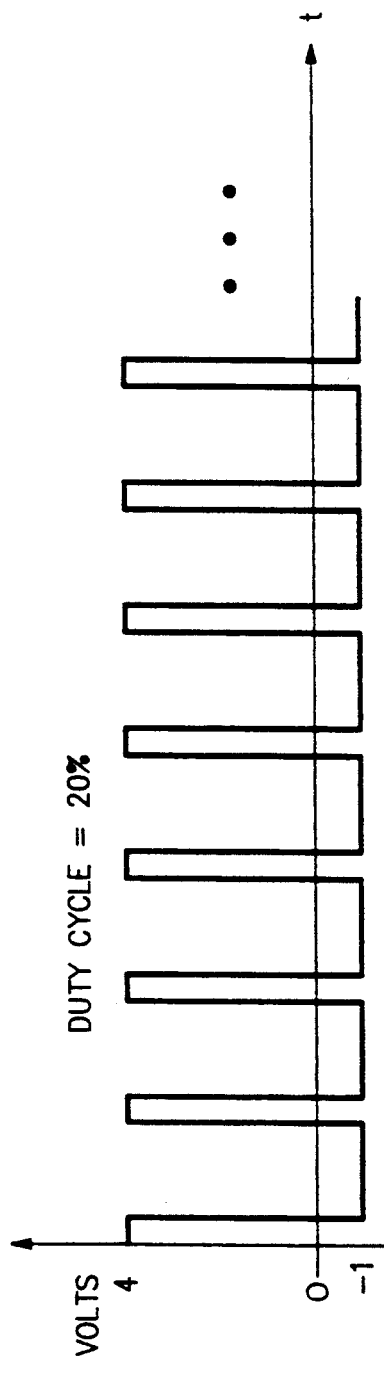
FIG. 7 (a-c) are plots of exemplary signals from a high pass filter of FIG. 2 having various duty cycles.
Figure 7B:
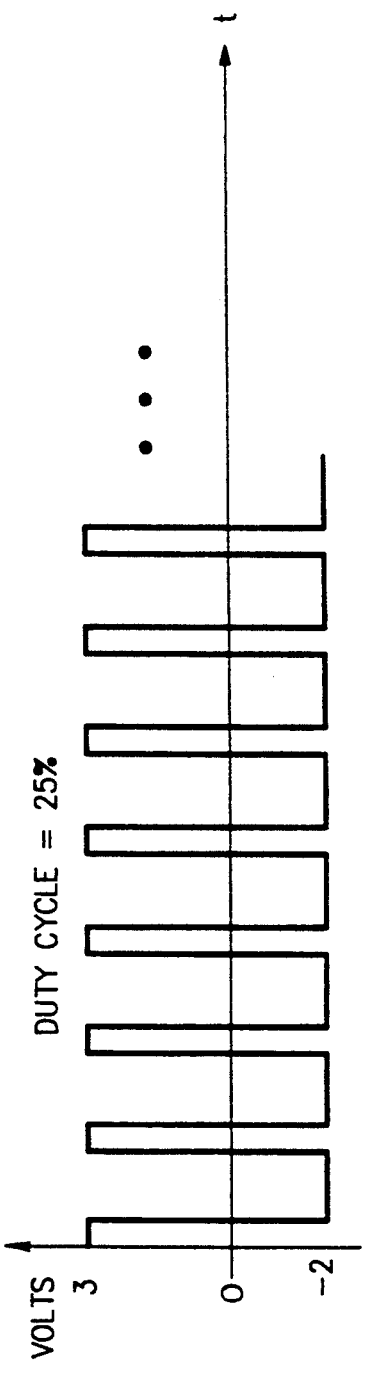
Figure 7C:
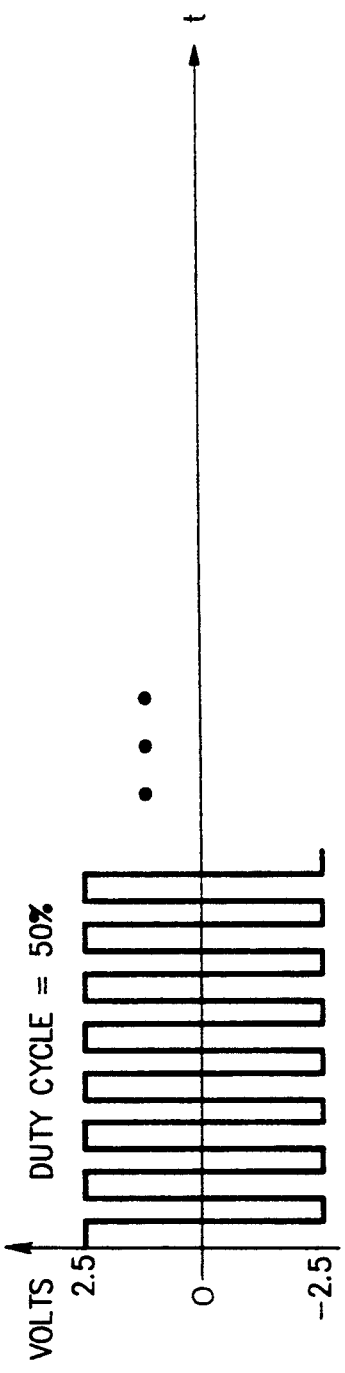

Referring to FIG. 7, to illustrate the need for the dc restoration circuit 272, when the duty cycle (i.e., the percentage of time the pulse is high compared to the total period) of the waveform changes, the dc level of the signal changes. However, because the high pass filter 114 has a 0 dc value output signal, the average value of the output signal will always be zero, independent of the duty cycle. This means that a pulse having the same amplitude will appear to have a different amplitude when compared to the same reference, e.g., 0v as shown in FIG. 7, thereby causing incorrect counting of pulses. The signal on the line 282 will be similar to the waveforms shown in FIG. 7 except that the lowest portion of the wave form will be shifted up to 0v. Other polarities of the signals may be used if desired.

The signal from the dc restoration circuit 272 on the line 282 is fed to a known low pass filter 284 comprising opamps, resistors, and capacitors, configured in a known negative feedback arrangement. The break frequency of the filter 284 is 1 MHz. The filter removes unwanted high frequency noise from the signal before being fed to the rest of the circuit on the line 120. Another or no low pass filter may be used if desired, depending on the amount and frequency of the noise present. Other circuit configurations for the signal conditioning circuit 118 or any part thereof may be used if desired.

The signal on the line 120 from the signal conditioning circuit 118 is fed to a first input of a comparator circuit 128. A reference voltage signal Vref is provided on a line 130 to a second input of the comparator circuit 128. The magnitude of the reference signal is set to a predetermined level, e.g., using a voltage divider, above the noise floor of the differentiated, pulsed, blanked-out, signal on the line 126, and below the lowest peak of the pulses expected on the input signal. The comparator provides an output signal on a line 132 having either a low, e.g. 0v, or a high, e.g., 5v, state. When the magnitude of the input signal on the line 126 is greater than the magnitude of the reference voltage on the line 130, the output signal of the comparator circuit 128 on the line 132 is high. Conversely, when the magnitude of the input signal is less than the magnitude of the reference signal, the output signal of the comparator circuit 128 on the line 132 is low. The comparator circuit 128 comprises a known comparator, e.g., LM211H, with positive feedback added to provide hysteresis, e.g., +/−5 millivolts, to the threshold set by the reference signal, thereby avoiding spurious noise from causing the output signal to change state. The comparator circuit 128 also provides pulses having a more uniform output amplitude, e.g., 5 volts, and less noise than the input signal on the line 126. Other configurations for the comparator circuit 128 may be used if desired.

The signal from the comparator circuit 128 on the line 132 is fed to a known pulse shaper 134 comprising, e.g., a Schmitt trigger buffer or a one-shot. The pulse shaper 134 provides a signal on a line 136 that is cleaner, i.e., the pulses are more square and the edges more vertical, than the signal from the comparator 128 on the line 132.

The output signal from the pulse shaper 134 on the line 136 is fed to a known 12 bit up-down digital counter 138, e.g., three 4-bit 74LS169B counters in series. The up-down counter 140 counts the number of pulses either in an up direction (each pulse received increments the counter by one count) or a down direction (each pulse received decrements the counter by one count) as determined by the sync signal on the line 106 from the ramp generator 100, i.e., a high signal on the line 106 causes the counter 138 to count up and a low signal causes it to count down. During the positive slope of the up-ramp waveform (FIG. 4, illust c), the sync signal on the line 106 is high, and the up-down counter will count up one count for each pulse which appears on the signal on the line 136 from the pulse shaper 134. Similarly, during the zero slope portion of the up-ramp waveform, the sync signal on the line 106 is low, and the up-down counter will count down one count for each pulse which appears along that portion of the waveform. Thus, the resultant number of counts in the counter after one sweep period of the up-ramp waveform is the difference between the number of pulses on the positive slope portion of the input signal (FIG. 2, Illust. a; indicative of the distance to and velocity of the target 26) on the line 112 and the number of pulses on the flat portion of the same signal (indicative of the velocity of the target 26). Thus, the counter provides a digital binary signal N proportional to the distance L to the target 26 as discussed hereinbefore (i.e, $L = Nc/2\Delta F$). Other size counters may be used if desired; however, the maximum number of pulses occurring and the time period for each sweep of the waveform must be considered in choosing the size of the counter.

The value of the digital binary signal in the counter is provided on a plurality of lines 140, one for each bit, e.g., 12 lines, to a D/A converter circuit 142 comprising an input buffer, e.g., 74LS174, and a D/A converter, e.g., Analog Devices, Part No. DAC80P. The D/A converter circuit 142 converts a binary digital signal on the lines 140 from the up-down counter 138 to an analog signal indicative thereof on a line 144. The D/A converter circuit 142 performs a conversion each time it receives a rising edge of the sync signal (FIG. 4, Illust. b) on the line 106 from the ramp generator 100. When the rising edge of the sync signal occurs, the digital binary signal on the lines 140 are latched by the buffer in the D/A converter circuit 142, thereby preventing subsequent changes in the up-down counter 138 from affecting the D/A conversion until the next rising edge of the sync signal.

The analog output signal from the D/A converter circuit 142 is provided on a line 144 to a known low pass filter 146. The low pass filter 146 comprises an opamp, resistors, and capacitors in a known negative feedback arrangement. The break frequency of low pass filter is 3 Hz; however, other frequencies may be used if desired. The low pass filter 146 provides a signal on a line 148 indicative of the average value of the analog signal on the line 144, thereby providing an averaged analog voltage signal proportional to the distance L to the target 26.

The signal on the line 148 is fed to a gain stage 150, which multiplies the magnitude of the signal on the line 148 by a predetermined value, e.g., $c/2\Delta F$, to provide a signal on a line 152 indicative of the distance L to the target in the desired units, e.g., feet.

Figure 8:
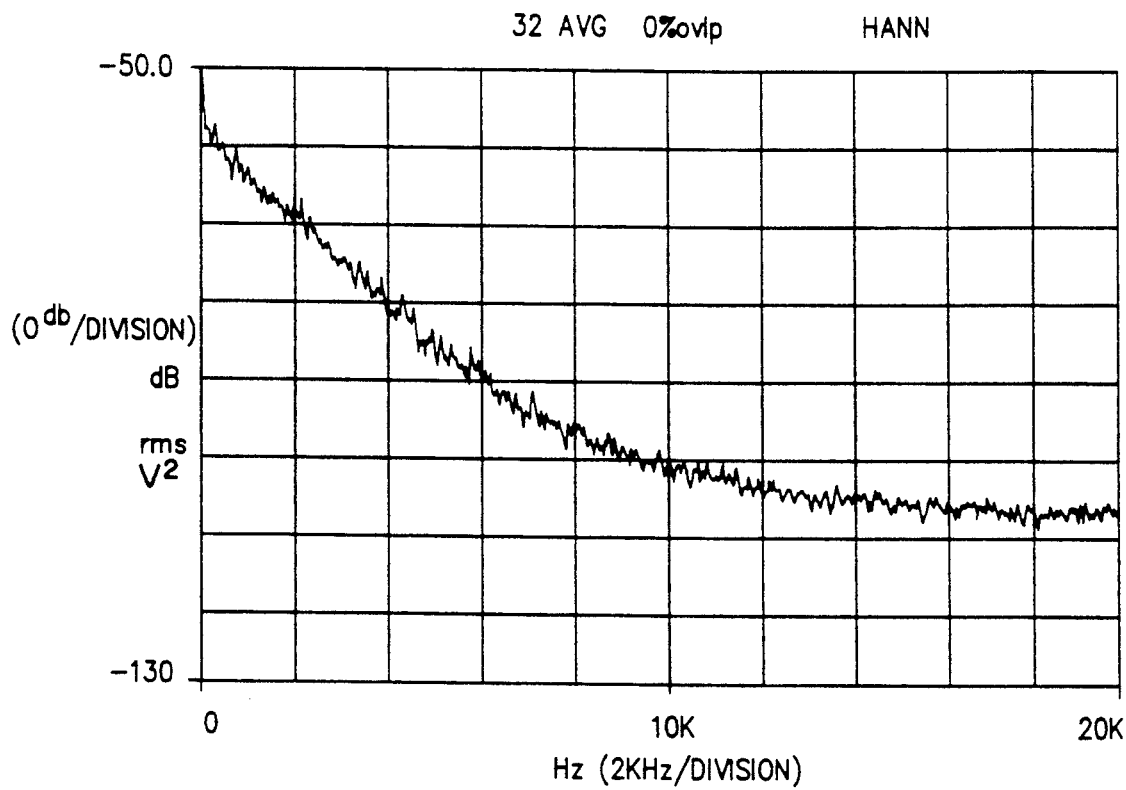
FIG. 8 is a plot of the speckle noise against frequency, showing that speckle noise decreases with increasing frequency.

Referring now to FIG. 8, it is known that with a constant (dc) current drive signal driving the laser diode 10 (i.e., with the laser running at a constant optical frequency), the magnitude of the speckle noise component (in db/hz) on the optical feedback decreases as the frequency increases, i.e., the noise component of the feedback signal on the line 32 (FIG. 1) exhibits a frequency spectrum which has high amplitude energy at low frequencies and low amplitude energy at high frequencies. We have found that by increasing the sweep frequency of the current ramp waveform, the speckle noise reduces in amplitude (similar to the frequency spectrum). Reduced speckle noise reduces the overall noise floor of the feedback signal and allows the comparator circuit 128 (FIG. 2) to detect the correct number of pulses due to target distance and/or velocity on the ramp or the flat portion of the feedback waveform. Current applications, e.g., using an up-down ramp drive signal, use sweep frequencies of less than 100 Hz. The ramp sweep frequency used herein is 1 kHz which may be increased to 20 khz and higher if desired, to provide more speckle reduction. The higher the ramp frequency, the lower the speckle noise, and, thus, the more accurate the distance measurement. The speed of the electronics is the only limiting parameter in increasing the sweep frequency. The speckle noise shown in FIG. 8 was obtained using a continuous time spectrum analyzer averaging 32 samples through a Hanning window.

Figure 9:
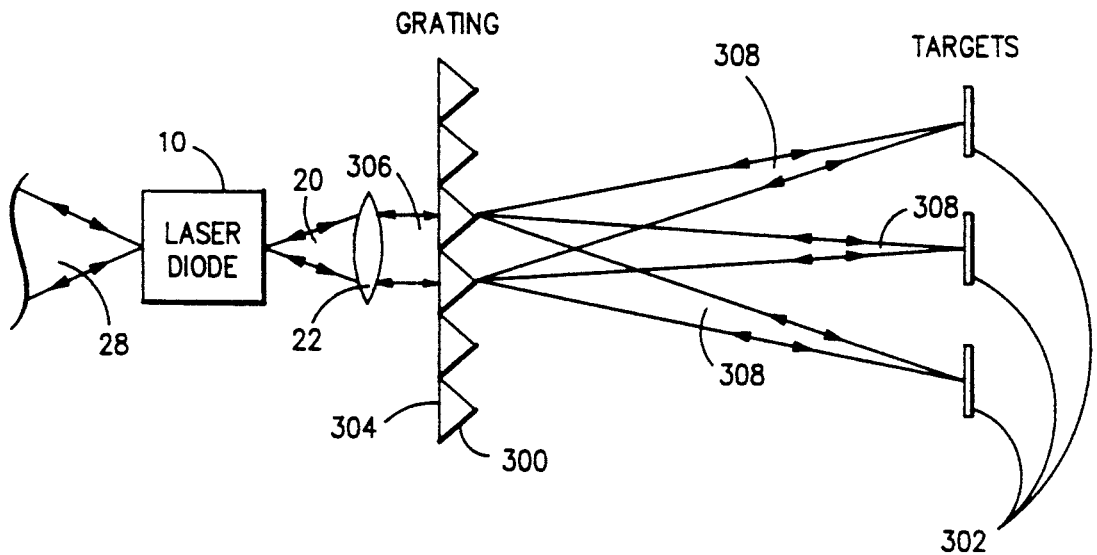
FIG. 9 is a diagram showing a configuration of the present invention using a plurality of targets.

Referring now to FIG. 9, it should be obvious to those skilled in the art that the invention may be used to detect the distance to one of a plurality of targets 300 by laterally dispersing the light using a grating 302 having a nonreflective surface 304. In that case, the lens 22 is placed a distance from the laser diode so as to provide a collimated beam 306 to the grating 300 which converts the light into a plurality of laterally dispersed focussed beams 308. The target having the closest distance to the lens 22 will produce the largest intensity magnitude pulses on the optical feedback signal. Therefore, a comparator with a variable threshold or a plurality of comparators with different thresholds may be used to calculate the distance to the closest target (ideal for use as a collision detector). Alternatively, the grating 300 may be incorporated into the lens 22 as one assembly. Instead of a grating 300, one or more prisms, or beam splitters, or rotating components may be used to disperse the light. Also, optical switches, such as electronically controlled polarizers, may be placed in the path of the individual beams to switch the beams in and out.

As discussed hereinbefore, the direction the target is moving determines the polarity of the pulses of the differentiated signal (i.e., whether the pulses extend in the positive or negative direction). More specifically, when the target is moving toward the laser, the pulses due to velocity appear in the positive direction, and when moving away from the laser, the pulses due to velocity appear in the negative direction. Therefore, even though the invention has been described as being used with the target traveling in a single direction, i.e., toward the laser, it should be understood by those skilled in the art that the electronics may be easily modified to be used for detecting targets traveling in either direction, i.e., detect both positive and negative going pulses.

It should be understood by those skilled in the art that there are many other known acceptable circuit configurations available to implement the signal processing functions performed by the distance measurement circuit 18, i.e., isolating the pulses and characterizing the number of pulses per ramp cycle. Also, even though the invention has been illustrated as being implemented using hardware electronic devices, it should be understood by those skilled in the art that the invention will work equally well if the hardware circuits 100, 114, 118, 122, 128, 134, 138 are implemented by a computer in software, and an A/D converter is added to convert the signal on the line 112 to digital bits.

Although the invention has been described as using a semiconductor diode, the invention will work equally well with any laser having an optical operating frequency that may be varied (or chirped) over an acceptable range and other characteristics compatible for distance measurement (discussed hereinbefore).

Instead of using an up-ramp waveform, the invention of using high sweep frequencies to reduce speckle and/or of blanking-out the signal may be implemented with any laser drive waveform. Also, instead of removing the square wave portion of the differentiated signal, the pulses may be isolated from the drive waveform shape prior to other signal conditioning such as differentiation. Furthermore, instead of counting pulses, the feedback signal may be analyzed using a known frequency spectrum analyzer and then converting the resultant frequency to the number of pulses on the feedback signal, knowing the time over which the signal was analyzed. However, it should be understood that the pulses may not have equal time spacing between them, thereby producing a broad frequency spectrum from which the pulse frequency must be extracted.

Other patents relating to optical coherent distance measurement include U.S. Pat. No. 4,733,609, Goodwin et al.

Although the invention has been described and illustrated with respect to exemplary embodiments thereof, it should be understood by those skilled in the art that the foregoing and various other changes, omissions and additions may be made without departing from the spirit and the scope of the invention.

We claim:

1. A laser-based distance measuring device for measuring the distance to a target, comprising:

a laser, having a variable optical operating frequency, and having a first facet and a second facet for emitting a first output light from said first facet toward the target and for emitting a second output light from said second facet;

the first output light being incident on the target and having a wavelength which allows it to be scattered by the target back into said laser;

laser drive means, for providing a variable laser drive signal to said laser for varying the optical operating frequency of said laser, said laser drive signal having a predetermined periodic sweep frequency set to minimize speckle noise;

the second output light having an intensity related to the distance from said front facet to the target due to coherent interference within said laser between the scattered light from the target and light within said laser;

optical detection means, responsive to the second output light, for providing a feedback signal indicative of the intensity of the second light; and distance measurement means, responsive to said feedback signal from said optical detection means, for providing a signal solely proportional to the distance from said first facet to the target.

2. Apparatus of claim 1 wherein said laser drive signal comprises a sequence of single ramp portions interspersed with stepped-down flat slope portions.

3. Apparatus of claim 1 wherein said distance measurement means further comprises means for blanking-out a portion of said feedback signal coincident with discontinuities of said laser drive signal.

4. Apparatus of claim 1 wherein said distance measurement means further comprises means for blanking-out a portion of said feedback signal coincident with discontinuities caused by processing said feedback signal.

5. Apparatus of claim 1 wherein said distance measurement means further comprises means for counting pulses of said feedback signal.

6. Apparatus of claim 1 wherein said distance measurement means further comprises focusing means, placed in the path of the first output light, capable of focusing the first output light at a predetermined distance from said focusing means.

7. Apparatus of claim 1 wherein said laser comprises a laser diode.

* * * * *